United States Patent [19]
Aoki et al.

[11] 3,896,304

[45] July 22, 1975

[54] AUTOMATIC FOCUS ADJUSTMENT MEANS

[75] Inventors: Harumi Aoki, Tokyo; Takuo Itagaki, Wako, both of Japan

[73] Assignee: Asahi Kogaku Kogyo Kabushiki Kaisha, Tokyo, Japan

[22] Filed: Oct. 4, 1973

[21] Appl. No.: 403,534

[30] Foreign Application Priority Data
Oct. 4, 1972 Japan.................. 47-99544

[52] U.S. Cl................. 250/201; 250/209; 354/25; 354/31; 318/640
[51] Int. Cl........................... G03b 3/00; G01j 1/20
[58] Field of Search............ 250/201, 209; 356/122; 95/44 R; 354/25, 31; 318/640

[56] References Cited
UNITED STATES PATENTS

| | | | |
|---|---|---|---|
| 3,610,934 | 10/1971 | Turner | 250/201 X |
| 3,622,797 | 11/1971 | Bragg | 250/201 X |
| 3,713,371 | 1/1973 | Kurihara et al. | 250/209 |

Primary Examiner—James W. Lawrence
Assistant Examiner—T. N. Grigsby
Attorney, Agent, or Firm—Christie, Parker & Hale

[57] ABSTRACT

An image is formed on a plane by light passing through a lens. The lens and the plane are movable relative to each other so as to focus the image. A self-scan type photoelectric element linearly scans the intensity distribution of the image and, in response, provides an electrical signal used in a positioning mechanism that provides for maximizing the intensity distribution so as to bring the image into focus.

5 Claims, 13 Drawing Figures

AUTOMATIC FOCUS ADJUSTMENT MEANS

BACKGROUND OF THE INVENTION

In general, the present invention relates to an automatic focus adjustment means for optical systems. More particularly, it relates to such a focus adjusting means utilizing self-scan type photoelectric element.

Several methods are known for automatic focus adjustment in photographing operation employing cameras. One method is to adjust the position of the lens in accordance with the distance between the camera and the object to be photographed. The method which is generally adopted is, however, to make focus adjustment in accordance with the detected contrast of the image of the object to be photographed.

One of the methods for detecting contrast utilizes the dip effect of photoelectric elements such as a CdS element. According to this method, utilization is made of the fact that, if an image is formed at the surface of a photoelectric element, the electric resistance of the element is maximum when the optical system is in focus, that is, the contrast is greatest, and the electric resistance decreases as the image is brought out of focus, and the variation of the output of the photoelectric element owing to this effect is detected.

Another of the methods is the image scanning method. According to this method, the image of the object to be photographed is scanned by for example a slit and the obtained waveform indicating the intensity distribution of the image is processed. For example, frequency analysis is made of the waveform, and the in-focus position is obtained as the position containing greatest number of high frequency components.

The latter method is theoretically of better accuracy than the former method and is the most suitable method. However, to incorporate such known scanning means as a rotating disc with slit, an image pickup tube, etc. in a camera body would cause the difficulty of making the camera unduly bulky.

SUMMARY OF THE INVENTION

The object of the present invention is to provide an automatic focus adjustment means of small size and high accuracy. A key element is a newly developed self-scan type photoelectric element.

According to the invention, an image is formed on a plane by light passing through a lens. The lens and the plane are movable relative to each other so as to focus the image. The self-scan type photoelectric element linearly scans the intensity distribution of the image and, in response, provides an electrical signal. A positioning mechanism responsive to the electrical signal provides for adjusting the spacing between the lens and the plane to a relative position that maximizes the degree of intensity distribution and thereby focus the image.

Preferably, a motor is provided for moving the lens. In a technique contemplated by the invention, sequential samples of two memorized signals are compared and the motor is electrically driven when the memorized signals differ. To implement this technique in one embodiment, there is included a differentiating circuit for providing a differentiated signal in response to the electrical signal output of the photoelectric electric element. A pair of memory circuits provide the memorized signals that are compared. A high-pass filter circuit is coupled between the differentiating circuit and the memory circuits.

Also contemplated by the invention is a phase-detection technique. To implement this technique in one embodiment there is included oscillating means for vibrating the photoelectric element. A motor is provided for moving the lens. Phase detecting means responsive to the electrical signal and the oscillating means electrically drives the motor.

Other embodiments of the invention are described in detail hereafter and are defined in the appended claims.

BRIEF DESCRIPTION OF THE DRAWINGS

FIGS. 4, 5 and 6 are graphs each illustrative of the operating of the first automatic focus adjustment means according to the present invention. FIG. 4 shows the output waveform of the high frequency filter 9 at the time when the self-scan type photoelectric element scans the in-focus position image during the first scan period $\tau_1$ and scans the out-of-focus position image during the next scan period $\tau_2$. FIG. 5 shows the variation of the output waveform when the electric signal as shown in FIG. 4 is applied to the rectifier circuit as an input. FIG. 6 shows the variation of the d.c. voltage (current) obtained from the rectifier circuit 10 with variation of out-of-focus amount;

DETAILED DESCRIPTION INTRODUCTION

According to the present invention, a self-scan type photoelectric element is placed at the image plane so as to transform the light intensity distribution of the image into electric signal, and the in-focus position is obtained through processing of the resulting waveform.

The self-scan type photoelectric element employed in the present invention consists of a great number of very small photodiodes closely arranged in a straight line and a scan driving circuit which are "integrated". This element can linearly scan the intensity distribution of the image and make transformation into electric signal. The greatest advantage of this element is that the whole size of the element is very small. Such self-scan type photoelectric element is commercially available and is well known. For example, the Reticon Company, a United States Company, sells such a device under the designation "Linear Arrays", Model RL128L.

Means of several different structures are considered according to the way of processing the waveform. Disclosed herein are five kinds of means, which are broadly divided into two classes according to difference in information abstracted from light intensity distribution of the image. One of the two methods corresponding to these classes respectively is to fix the spatial frequency band to evaluate the degree of out-of-focus state from the image intensity (this method will be hereinafter referred to as fixed evaluation frequency method), and the other is to make this evaluation spatial frequency variable or plural (this method will be hereinafter referred to as variable evaluation frequency method).

Figure 1:
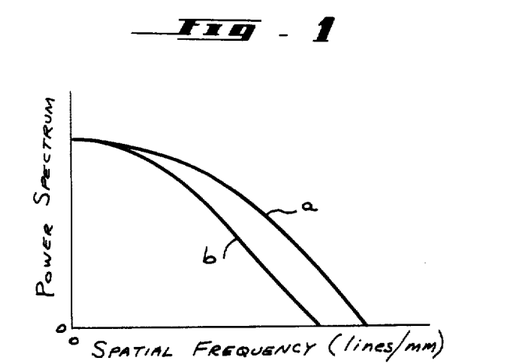
FIG. 1 is a graph showing the difference between the power spectrum of the in-focus position image (curve a) and the power spectrum of the out-of-focus position image (curve b).

Generally, the spatial frequency distribution (power spectrum) of image owing to action of lens becomes higher as the image comes near in-focus state, and it reaches the maximum value with the image in in-focus state (the curve a of FIG. 1). In every spatial frequency component of the image, the light intensity of the frequency reaches maximum value at in-focus position. As the degree of out-of-focus state increases, the light intensity of every spatial frequency of the image decreases (the curve b of FIG. 1). The difference of light intensity becomes greater as the spatial frequency becomes greater. The in-focus position is determined through detection of this light intensity difference. Evaluation of this difference can be made with respect to every spatial frequency. However, in low spatial frequency range, the light intensity difference is generally small, so that evaluation with low spatial frequency results in low accuracy. On the other hand, the highest spatial frequency component varies with the object to be photographed so that it is impossible to make evaluation with too high spatial frequency. Further, in higher frequency range, the OTF (response function) of the lens system is generally low, so that the light intensity of higher frequency range is lowered. As a result, evaluation with too high spatial frequency would produce low accuracy. The aforementioned fixed evaluation frequency method intends to determine the in-focus position through evaluation of the nature of light intensity distribution of the image with the spatial frequency fixed to a proper value which result in high accuracy independent of the influence of the object; while, according to the aforementioned variable evaluation frequency method, the evaluation frequency is suitable varied as the object varies.

For automatic focus adjustment it is necessary to provide a system for moving lens through a servo system in such a manner that, through detection of information whether the observed plane is before or behind the in-focus position (these "behind" and "before" states will be hereinafter referred to as "positive" out-of-focus and "negative" out-of-focus states, respectively), the lens is always caused to move to the in-focus position. For detection of these positive and negative out-of-focus states, there are two methods, one utilizing a memory circuit and the other a phase detector. According to the former method, the information for each image position obtained through a self-scan type photoelectric element is memorized, and through successive comparison of information at two positions, the lens is moved toward the in-focus position; while, according to the latter method, the light path length between the lens and the self-scan type photoelectric element is varied in the manner of an oscillation through an oscillating means so as to cause pulsation in the output electric signal, and the direction of lens movement is determined through the resulting phase detection signal.

According to the present invention, the following five kinds of apparatus are provided as examples through suitable combination of the above mentioned evaluation frequency methods and electric processing method. While the corresponding methods will be described later, the summary of the method and the characteristic of each of these apparatus are given herebelow:

In the first apparatus of the present invention, the aforementioned fixed evaluation frequency method is adopted, and, as means for detecting positive-negative out-of-focus states, a memory circuit is employed.

In the second apparatus of the present invention, a memory circuit is provided and processing is made in the same manner as the first apparatus while there is introduced the afornementioned variable evaluation frequency method. With this apparatus, although it is greater in size than the first apparatus, it is possible to make detection of in-focus position of the image of approximately arbitrary objects of different spatial frequency distribution.

In the third apparatus of the present invention, a phase detector is employed for detecting positive-negative out-of-focus states, and the aforementioned fixed evaluation frequency method is adopted.

In the fourth apparatus of the present invention, a phase detector is employed as the third apparatus, and the aforementioned variable evaluation frequency method is adopted. Although the method of processing the output signal is entirely the same as that of the third apparatus, it is possible to detect accurate in-focus position independent of the spatial frequency distribution of the object.

In the fifth apparatus of the present invention, detection is made of the greatest of the differentiation values of the image light intensity distribution obtained through a differentiation circuit in the first apparatus. Generally, the differentiation value of the image light intensity distribution at in-focus position is always greater than that at out-of-focus position. Thus, the maximum value of the differentiation values of the image light intensity distribution at various positions reaches the maximum value at in-focus position. Utilizing this fact, in this apparatus, the electric signal representing the image light intensity distribution obtained by the self-scan type photoelectric element is transformed into differentiated electric signal through a differentiation circuit, and then, the in-focus position is detected through taking out the voltage or current value representing the maximum value of the signal.

The characteristics and advantages of the present invention are as follows:

1. The self-scan type photoelectric element employed in the present invention is so small in size that it can be readily incorporated in a camera body. The system for processing the electric signal obtained by this element can be constituted by an integrated circuit so that it is possible to provide a camera having an automatic focus adjustment means which is compact and light in weight.

2. Since the image light intensity information is taken out through image scanning, it is possible to obtain the information of accurate spatial frequency component of the image. Thus, the accuracy of focusing is better than that of conventional method utilizing dip effect of photoelectric element.

3. The memory circuit employed by the first, the second and the fifth apparatus can recognize positive-negative out-of-focus state in a simple manner. This memory circuit can be constituted in an integrated circuit, and further, it is not necessary to provide the light path oscillating means of the third and the fourth apparatus, so that it is possible to form the whole of the apparatus in a compact manner.

4. While detection of out-of-focus amount by means of the above mentioned memory circuit is carried out stepwise, the phase detector employed in the third and the fourth apparatus can carry out focus adjustment in analogue manner so that it is possible to detect in-focus position with higher accuracy.

5. The great feature of the variable evaluation frequency method adopted by the second, the fourth and the fifth apparatus is that detection of in-focus position can be carried out with respect to objects of any frequency component. While the fixed evaluation frequency method is advantageous in that the structure is simple, the evaluation spatial frequency is limited so that focusing cannot be made with respect to objects whose spatial frequency is lower than the limited one. Variable evaluation frequency method eliminates such drawback by evaluating the nature of the image light intensity distribution with respect to various frequency ranges.

6. The greatest feature of the maximum differentiation value detection method is that the electric signal obtained by the self-scan type photoelectric element can be processed by a relatively simple electric circuit. Since detection is made of the maximum differentiation value of the image light intensity distribution at various positions, this method is a kind of variable evaluation frequency method so that the in-focus position can be readily obtained with respect to any object.

Figure 2:
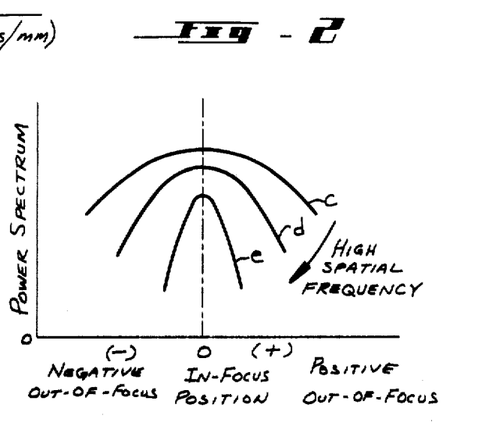
FIG. 2 is a graph showing variation of image power spectrum on both sides of in-focus position with respect to spatial frequencies of three different values. The spatial frequency increases in the order of curves c d e.

The basic principle of the in-focus position detecting means according to the present invention will be readily understood with reference to FIGS. 1 and 2. FIG. 1 shows in a simple manner the spatial frequency distribution of the image with respect to various positions on the optical axis. The axis of abscissa is plotted with spatial frequency, while the axis of ordinate is plotted with light intensity (power spectrum). The curve a of FIG. 1 shows the spatial frequency distribution of the image at in-focus position, while the curve b shows the spatial frequency distribution of the out-of-focus image. Generally, the light intensity with respect to various spatial frequencies of the image is lowered as the image moves further from the in-focus position. This phenomenon can be understood with reference to FIG. 2, where curves show light intensity variation with respect to various spatial frequencies, with out-of-focus amount plotted on the abscissa axis. In FIG. 2, the spatial frequency increases in the order of the curves c d e. The higher the image spatial frequency component becomes, the more rapidly the light intensity drops with respect to increase of out-of-focus amount. Thus, the basic principle of the present invention is to detect the in-focus position with high accuracy by taking out high spatial frequency component of the image.

DETAILED DESCRIPTION OF THE FIRST EMBODIMENT

Figures 3, 8:
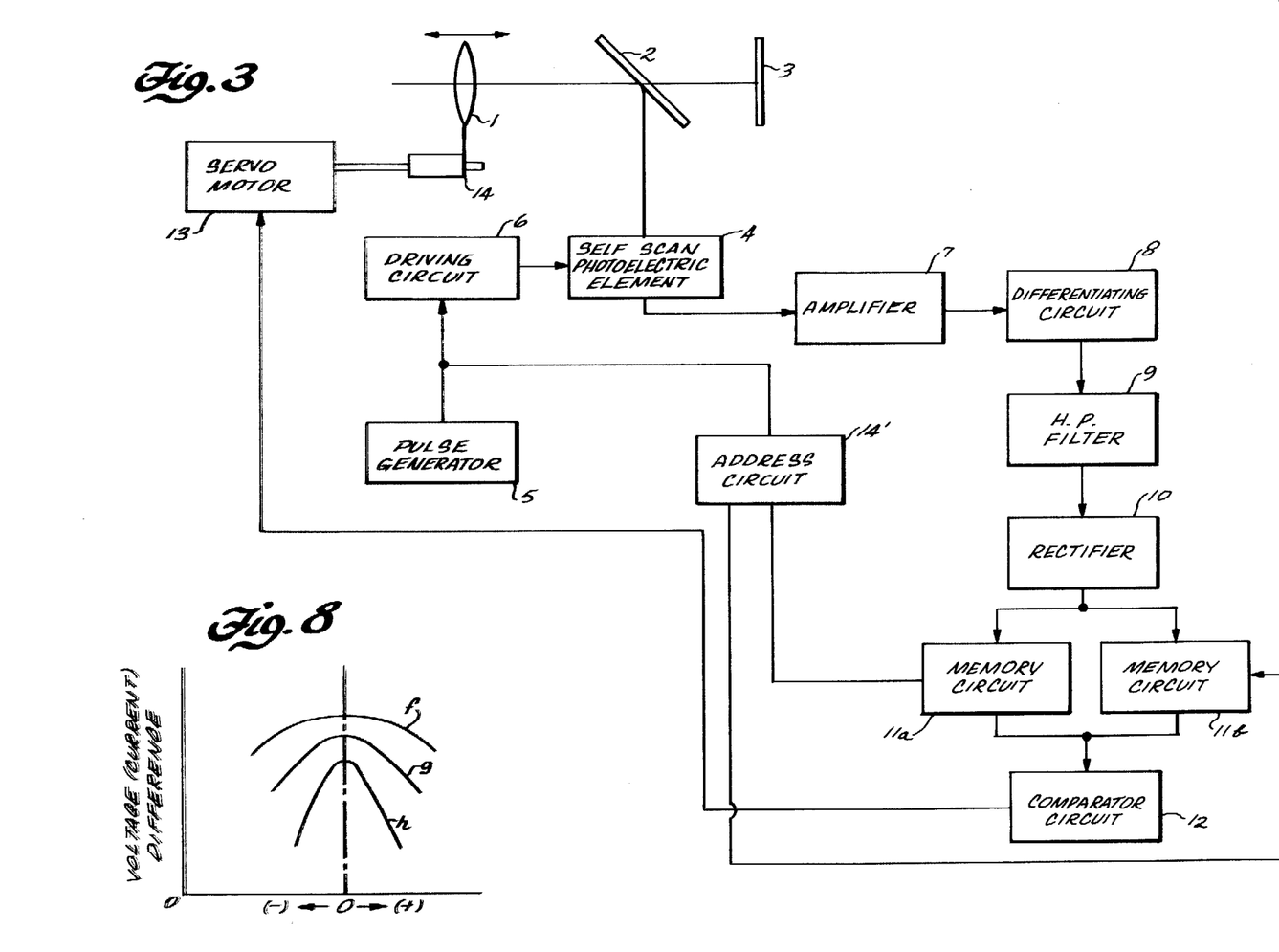
FIG. 3 is a block diagram showing a first embodiment of the first automatic focus adjustment means according to the present invention.
FIG. 8 is a graph related to the variable evaluation frequency method introduced in the second automatic focus adjustment means according to the present invention. This graph shows variation of d.c. voltage (current) difference obtained through three kinds of band-pass filters on both sides of the in-focus position. The order of the curves f g h corresponds to the order of increase of the pass-frequency of the band-pass filters, the curves corresponding to the outputs of the band-pass filters.

The structure of the first apparatus of the present invention is shown in FIG. 3. In FIG. 3 there are shown an objective 1, a half-transparent mirror 2 and a film surface 3. A part of the image-forming light rays is reflected by the half-transparent mirror 2. At a position which corresponds to the position of the film surface 3 with respect to the reflecting action of the mirror 2, there is arranged a self-scan type photoelectric element 4. This half-transparent mirror can be replaced by a single lens reflex mirror which is a reflecting mirror that is swung up upon photographing operation. The self-scan type photoelectric element 4 starts scanning through action of a driving circuit 6 which starts to act through pulse action generated by a clock pulse generating circuit 5, and transforms the intensity variation of the received light into time sequence electric signal. This self-scan type photoelectric element is repeatedly scanned in the same direction through trigger pulses of constant frequency generated by the clock pulse generating circuit 5. The output electric signal is amplified by an amplifier 7 and then differentiated by a differentiation circuit 8. The resulting signal is subjected to the action of high frequency filter 9, which lets pass only the a.c. component of frequency that is greater than a suitable high frequency value, and then applied as input to a rectifier circuit 10. Thus, the signal is transformed into a rectified signal. The thus obtained d.c. voltage value is memorized by a suitable first sample-and-hold or memory circuit 11a.

Then, when a servomotor 13 is actuated so that the lens shifting means 14 acts to cause the lens 1 to be moved in the direction of the optical axis, the light intensity distribution of the image of different position is scanned by the same self-type photoelectric element 4 and is transformed into electric signal. Then, the same process as that mentioned above is made, and the d.c. voltage value which is obtained as the output of the rectifier circuit 10 is memorized by a second sample-and-hold or memory circuit 11b.

The memory instruction and reset instruction of these memory circuits 11a and 11b are made in synchronism with the clock from a clock pulse generating circuit 5. Thus, the clock from the clock pulse generating circuit 5 controls the memory circuits 11a and 11b through an address circuit 14'. The first clock gives a set instruction to the memory circuit 11a, then the second clock gives a set instruction to 11b. The opening-closing of these two memory circuits 11a and 11b is repeatedly controlled. The difference between the two d.c. voltage values memorized by these two memory circuits is detected by a comparator circuit 12, for which, for example, a differential amplifier can be employed. If the memory circuits 11a and 11b have memory contents A and B, respectively, then a d.c. output voltage which is proportional to the value A−B is obtained by this comparator circuit 12. The plus or minus sign of this value determines one or the other direction or rotation of the servomotor 13 which continues to operate until the state is reached that A=B, so that the driven lens reached the in-focus position. Generally, the d.c. component memorized by such memory circuits reached the maximum value at the in-focus position and becomes smaller before and behind this position. Therefore, a servo control as mentioned above makes it possible to find accurate in-focus position.

Figure 4:
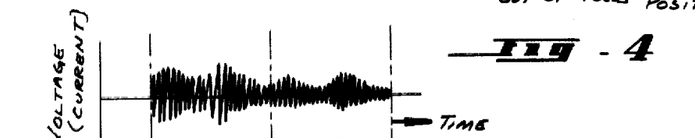
Figure 5:
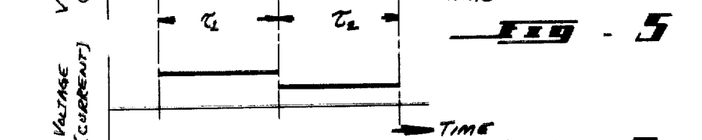
Figure 6:
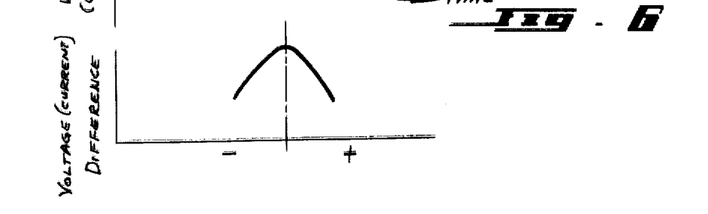

FIGS. 4, 5 and 6 show the method of servo control of the first apparatus. As shown in FIG. 4, in the electric signal produced by the high frequency filter 9, the voltage value or the current value varies in response to the light intensity of the high frequency component of the image. The frequency of the carrier signal of FIG. 4 is related to the operation of the driving circuit 6. This frequency is generated by switching one-by-one the unit elements in the element 4. Accordingly, the output of the rectifier circuit 10 is obtained as d.c. voltage values or current values corresponding to the degree of the variation, as shown in FIG. 5. In FIGS. 4 and 5, the axis of abscissa is plotted with the scanning time of the self-scen type photoelectric element, while the axis of ordinate is plotted with voltage or current value. Also, in FIGS. 4 and 5, the output voltage (current) values with respect to images of in-focus position and out-of-focus position are shown with respect to the first scan period $\tau_1$ and the next scan period $\tau_2$, respectively. (Each of these scan periods corresponds to the time between successive pulses generated by the circuit 5.) The phenomenon is as shown in FIG. 6, where the axis of ordinate is plotted with the d.c. voltage (current) value from the rectifier circuit 10, while the axis of abscissa is plotted with out-of-focus amount. The peak of the curve of FIG. 6 corresponds to the in-focus position. To detect this peak is the method of the first apparatus.

DETAILED DESCRIPTION OF THE SECOND EMBODIMENT

Figure 7:
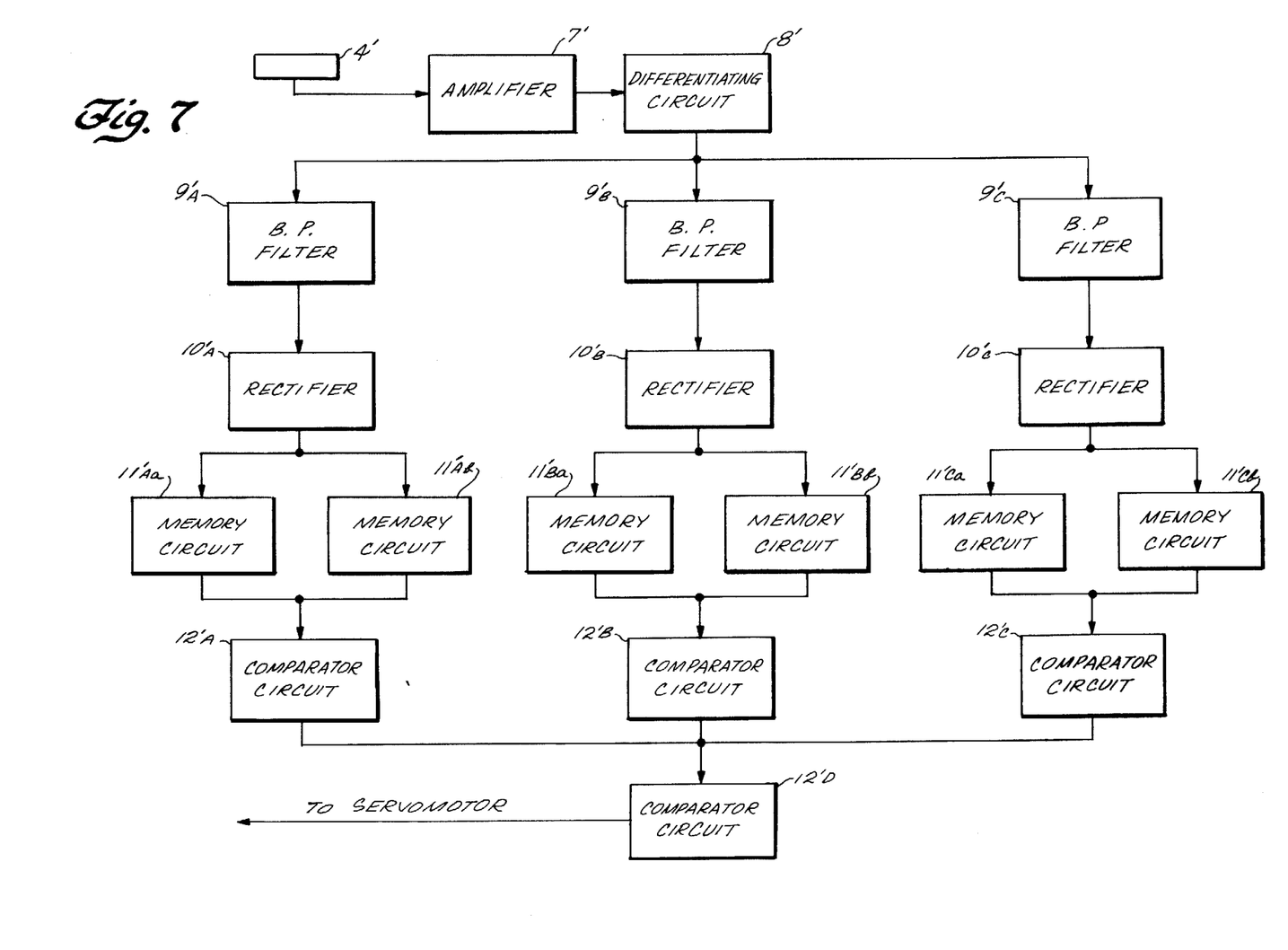
FIG. 7 is a block diagram of a portion of a second embodiment of automatic focus adjustment means according to the present invention.

In the second apparatus of the present invention, the electric processing system of FIG. 3 is modified into that of FIG. 7 to which variable evaluation frequency method can be applied. In the same manner as that of the first apparatus, the electric signal generated by a self-scan type photoelectric element 4' becomes differentiation signal through a differentiating circuit 8'. This signal is applied simultaneously as inputs to a plurality of band-pass filters of different filtering frequency bands (for example, three band-pass filters 9'A, 9'B and 9'C of FIG. 7). The filtered electric signals are transformed, in the same manner as that of the first apparatus into d.c. voltage values through rectifier circuits 10'A, 10'B and 10'C, respectively, and memorized by memory circuits 11'Aa, 11'Ba and 11'Ca, respectively. Then, the lens 1 is moved by the action of the motor 13, and the light intensity distribution of the image at a different position is scanned by the self-scan type photoelectric element 4'. The resulting d.c. voltage values are memorized by memory circuits 11'Ab, 11'Bb and 11'Cb, respectively. The operation of these memory circuits are controlled in synchronism with the clock of the clock generating circuit 5 for the self-scan type photoelectric element, in the same manner as that of the first apparatus. Then, the differences of d.c. voltage values memorized by the memory circuits 11'Aa and 11'Ab, 11'Ba and 11'Bb, and 11'Ca and 11'Cb, are detected by comparator circuits 12'A, 12'B, and 12'C, respectively. The comparator circuit 12'D detects only the greatest one of the d.c. voltage differences obtained as outputs of the comparator circuits 12'A, 12'B and 12'C, respectively. Each of these comparator circuits 12'A, 12'B, 12'C and 12'D detects not only the absolute values of the d.c. voltage differences but also the plus-minus signs of the differences, in the same manner as that of the first apparatus. Thus, comparison is made as to the high or low degree of the memorized d.c. voltage values. Through employment of such comparator circuits, the lens 1 is always moved to a position corresponding to the image of higher d.c. voltage value by means of the action of the servomotor 13. In this manner, whether the first position of the image is in positive or negative out-of-focus state, the in-focus position can be determined.

The reason why this second apparatus adopts variable evaluation frequency method which is not adopted by the first apparatus is that, if the evaluation spatial frequency is fixed to a certain high value, then it would be impossible to detect in-focus position with respect to objects containing only spatial frequency components which are lower than said value. This will be described with reference to FIG. 8: When, as in the case of the first apparatus, a high frequency filter is employed which lets pass high frequencies over a certain value, if the image contains such high frequencies, then there is produced a d.c. voltage difference variation which is the output of the comparator circuit as shown by the curve h of FIG. 8; while, if the image does not contain such high frequencies, then voltage difference is not produced. In this case, if band-pass filters are employed which let pass frequency bands which are lower than said high frequencies, then there are produced d.c. voltage difference variation such as shown by the curves g and f. Thus, in the example of the second apparatus as shown in FIG. 7, there are employed three kinds of band-pass filters which simultaneously detect voltage difference variations as shown by the curves f, g and h of FIG. 8, respectively. Even if the voltage difference variation corresponding to the curve h is not obtained from the object, the band-pass filter giving the voltage difference corresponding to the curve g or f acts so that it is possible to find the in-focus position. Such arrangement is the greatest feature of the second apparatus.

DETAILED DESCRIPTION OF THE THIRD EMBODIMENT

Figure 9:
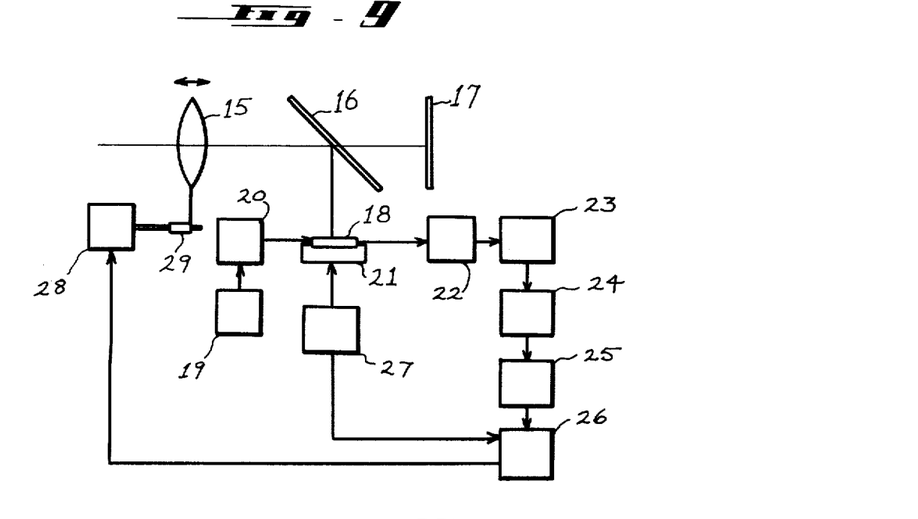
FIG. 9 shows a portion of a third embodiment of the automatic focus adjustment means according to the present invention.

The third apparatus of the present invention has the structure as shown in FIG. 9, where there are shown an objective 15, a half-transparent mirror 16 and a film surface 17. As in the first apparatus, a self-scan type photoelectric element is arranged at a position which corresponds to that of the film surface with respect to the reflecting action of the half-transparent mirror 2. However, the self-scan type photoelectric element 18 is fixed to an oscillating (i.e., vibrating) means 21 such as a piezoelectric crystal which is employed to cause the length of the light path between the lens and the self-scan type photoelectric element 18 to vary in the manner of an oscillation. Instead of causing the self-scan type photoelectric element 18 to oscillate, the lens 15 may be caused to oscillate, or the index of refraction of the light path between the lens 15 and the self-scan type photoelectric element 18 may be varied in the manner of pulsation through, for example, rotation of a wedge-shaped transparent plate, or such electro-optical crystals as KDP whose index of refraction varies with electric field, so as to obtain the same result.

Figure 10:
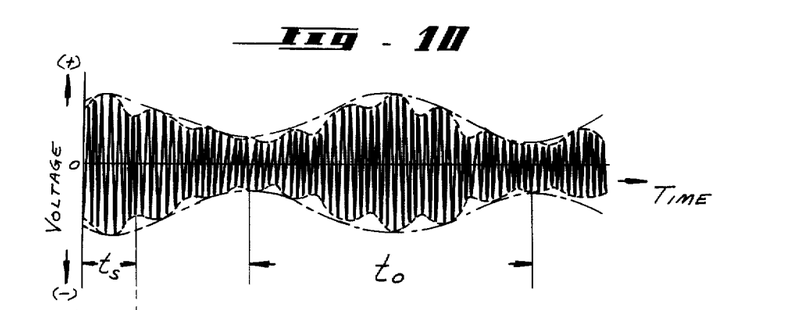
FIG. 10 shows the output waveform of the high frequency filter of the third automatic focus adjustment means according to the present invention as shown in FIG. 9. The character $t_s$ indicates one scan period of the self-scan type photoelectric element 18, and the character $t_o$ indicates one oscillation period of the oscillation of the oscillating means 21.
Figure 11:
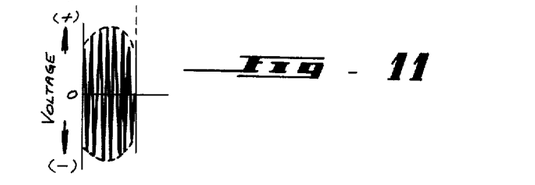
FIG. 11 shows the waveform of one period $t_s$ of the self-scan type photoelectric element as taken out of the waveform of FIG. 10. This indicates the waveform at the instant when the self-scan type photo electric element is at in-focus position.

Now description will be made with respect to one example of the methods in which the self-scan type photoelectric element 18 is caused to oscillate. The self-scan type photoelectric element 18 starts scanning through the actions of a clock pulse generator 19 and the driving circuit 20 so as to transform the light intensity variation into time sequency electric signal. The self-scan type photoelectric element 18 is fixed to the oscillating means 21 which, through the oscillation waveform produced by an oscillator 27, makes simple harmonic oscillation in the direction of the optical axis with constant amplitude, so that the electric signal produced by the self-scan type photoelectric element 18 varies in the manner of pulsation in synchronism with the signal produced by the oscillator 27. Arrangement is so made that the period of the oscillation of the oscillating means 21 ($t_o$ as indicated in FIG. 10) is sufficiently greater than the period of scanning of the self-scan type photoelectric element ($t_s$ as indicated in FIG. 10), and that the former period is the latter period multiplied by an integer. The thus obtained detection signal of the self-scan type photoelectric element 18 is amplified by an amplifier 22, and then differentiated by a differentiation circuit 23. The resulting signal is processed by a high frequency filter 24 which lets pass only frequencies over a certain high value. The resulting waveform of the electric signal is shown in FIG. 11, which shows pulsation voltage variation owing to the simple harmonic oscillation scanning of the self-scan type photoelectric element 18 obtained as the output of the high frequency filter 24 as a result of scanning of the image at the instant when the self-scan type photoelectric element 18 is positioned at the in-focus position.

The signal of this waveform is detected by a detecting circuit 25 so that only the envelope waveform as shown in dot-and-dash lines in FIG. 10 is taken out. The thus obtained voltage waveform is phase-detected by a phase detector 26 through comparison with the oscillation waveform from the oscillator 27. As a result, if the self-scan type photoelectric element 18 is oscillating with the in-focus position as the center, the greatest peak voltage value is obtained from the phase detector 26 as an output, while the output voltage value is lowered as the out-of-focus amount increases. Further, corresponding to positive and negative out-of-focus states the phase of the voltage waveform makes a difference of $\pi$, so that positive or negative out-of-focus state can be known as positive or negative sign of the d.c. voltage value obtained as the output of the phase detector 26, respectively. This voltage value with sign controls a servomotor 28 so that the shifting means 29 causes the lens 15 to be moved on the optical axis in one direction or the other until the voltage value reaches zero. Thus, the feature of the third apparatus is that the in-focus position is determined through phase detection type servo system.

DETAILED DESCRIPTION OF THE FOURTH EMBODIMENT

Figure 12:
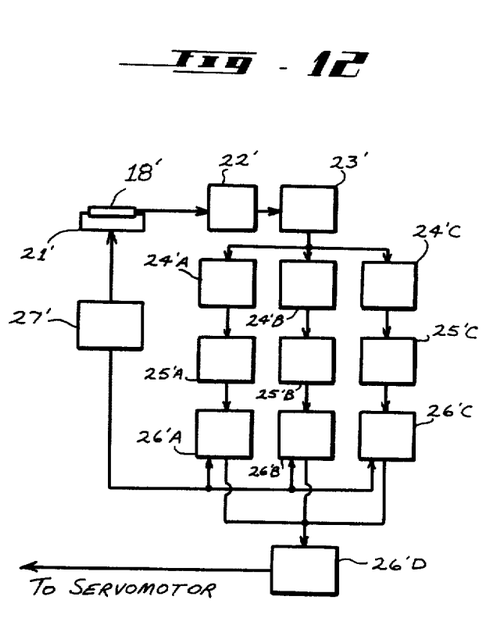
FIG. 12 is a block diagram showing a portion of a fourth embodiment of the automatic focus adjustment means according to the present invention.

The structure of the fourth apparatus of the present invention is the electric processing system of the third apparatus as shown in FIG. 9 modified into the structure as shown in FIG. 12. This fourth apparatus adopts aforementioned variable evaluation frequency method, and the basic principle and the feature of this method is as already described in connection with the third apparatus.

Referring now to FIG. 12, the electric signal produced by a self-scan type photoelectric element 18' is transformed into differentiation signal through an amplifier 22' and a differentiation circuit 23'. This process is the same as that of the third apparatus. Then, this differentiation signal is simultaneously applied as inputs to a plurality of band-pass filters 24'A, 24'B and 24'C of different filtering frequency bands (here, three kinds of band-pass filters). The filtered electric signal waveforms are detected by detecting circuits 25'A, 25'B and 25'C, respectively. Then, as in the third apparatus, phase detection is made by phase detectors 26'A, 26'B and 26'C, respectively. A comparator circuit 26'D detects the absolute value and the sign of the greatest voltage value of the resulting three outputs of the phase detection, and causes the lens to be always moved to the position of the image of higher d.c. voltage value by means of the action of the servomotor. Thus, the fourth apparatus corresponds to the third apparatus provided with the feature of variable evaluation frequency method as is the case with the second apparatus.

DETAILED DESCRIPTION OF THE FIFTH EMBODIMENT

Figure 13:
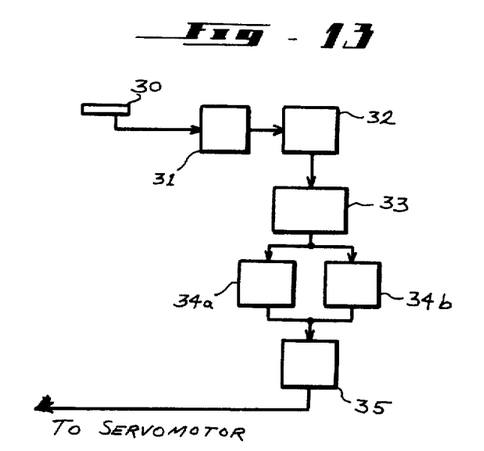
FIG. 13 is a block diagram showing a portion of a fifth embodiment of automatic focus adjustment means according to the present invention.

The fifth apparatus of the present invention is the electric processing system of the first apparatus as shown in FIG. 3 modified into the structure as shown in FIG. 13. The electric signal produced by a self-scan type photoelectric element 30 is transformed into differentiation signal through an amplifier 31 and a differentiation circuit 32. This resulting signal is applied as input to a peak value detecting circuit 33 which detects the maximum value of the differentiation signal during one period of scanning. The obtained maximum voltage value is memorized by a suitable memory circuit 34a. Then, as in the first apparatus, the action of the servomotor causes the lens to be moved in the direction of the optical axis, and thus the light intensity distribution of the image at a different position is scanned by the self-scan type photoelectric element 30. The obtained electric signal is processed in the same manner as that mentioned above, and the maximum voltage value is memorized by a second memory circuit 34b. A comparator circuit 35 detects the absolute value and the sign of the difference between the two d.c. voltage values memorized by the two memory circuits, respectively. The output signal of this comparator circuit controls the servomotor. This process is repeated until the voltage difference reaches zero so as to determine the in-focus position. The feature of the fifth apparatus is that utilization is made of the fact that the differentiation value of the light intensity distribution of the image reaches the maximum value at in-focus position irrespective of the spatial frequency distribution of the image. This method can provide a detecting means of simpler circuit structure and smaller size than other methods which have been already mentioned.

The features of the above mentioned systems are summarized as follows:

i. The first apparatus adopts fixed evaluation frequency method and employs a memory circuit for detecting the in-focus position. The number of the constituent parts is small and integrated circuit can be utilized so that the entire apparatus can be constituted in a compact manner. This apparatus can be incorporated in a camera body so that it is possible to provide a camera having an automatic focus adjustment means which is small in size and light in weight.

ii. The second apparatus adopts variable evaluation frequency method and employs a memory circuit, as in the first apparatus, for detecting the in-focus position. This apparatus is larger in size, but is of higher accuracy, than the first apparatus, and can determine the in-focus position with respect to objects of approximately arbitrarily different spatial frequency distribution.

iii. The third apparatus adopts fixed evaluation frequency method and employs a phase detector for detecting the in-focus position. With this apparatus it is possible to make focus adjustment in analogue manner so that detection of in-focus position can be carried out more accurately than the first or the second apparatus.

iv. The fourth apparatus adopts variable evaluation frequency method and employs a phase detector for detecting the in-focus position as in the third apparatus. This apparatus is provided with the advantage of variable evaluation frequency method as in the second apparatus in addition to the feature of the third apparatus.

v. The fifth apparatus can be constituted with smaller number of parts and adopts simpler electric processing method than the above mentioned other apparatus so that it is possible to provide more compact automatic focus adjustment means.

Heretofore it has been known that the method of making automatic focus adjustment by detecting the frequency distribution of the image through image scanning is theoretically excellent, but such apparatus has not been realized because the resulting apparatus has been considered to be too large in size. In these circumstances the present invention, which employs a self-scan type photoelectric element, provides apparatus of small size and high accuracy.

Each of the five apparatus of the present invention has its proper feature and can be employed as necessity demands. Especially, the apparatus which adopts variable evaluation frequency method can make focusing operation with respect to objects of approximately arbitrarily different spatial frequency distribution, so that this will bring about much wider use of optical instruments having automatic focus adjustment means.

We claim:

1. Automatic focusing apparatus comprising:

focusing means, including a lens spaced from a plane, for forming an image on the plane, the lens and the plane being movable relative to each other in either of two opposite directions;

circuit means for generating trigger pulses;

a self-scan type photoelectric element disposed in the plane for linearly scanning the intensity distribution of the image, said photoelectric element having an input for receiving the trigger pulses, and an output on which, in response, it provides a time-varying electrical signal indicative of the degree of the intensity distribution; and servomechanism means responsive to the time-varying electrical signal for adjusting the spacing between the lens and the plane to a relative position that maximizes the degree of intensity distribution.

2. Apparatus according to claim 1 wherein the servomechanism means includes a motor for moving the lens, a circuit for differentiating the electrical signal to provide a differentiated signal, and circuit means responsive to sequential samples of the differentiated signal for electrically driving the motor.

3. Apparatus according to claim 2 wherein the circuit means for electrically driving the motor includes a pair of memory circuits, a high-pass filter circuit coupled between the differentiating circuit and each of the memory circuits, each of the memory circuits alternately memorizing the signal coupled to it, and a comparator circuit for detecting differences between the memorized signals, and wherein the motor is driven in response to the comparator circuit.

4. Apparatus according to claim 2 wherein the circuit means for electrically driving the motor comprises a plurality of pairs of memory circuits, a plurality of band-pass filter circuits each being coupled between a respective pair of memory circuits and the differentiating circuit, and comparator means responsive to the memory circuits for electrically driving the motor.

5. Apparatus according to claim 1 further including oscillating means for varying the length of the light path between the lens and the plane, and wherein the servomechanism means includes a motor and phase detecting means responsive to the oscillating means and the electrical signal for electrically controlling the motor.

* * * * *